(12) United States Patent
Liukku et al.

(10) Patent No.: US 11,526,000 B2
(45) Date of Patent: Dec. 13, 2022

(54) TWO-AXIS MEMS MIRROR WITH SEPARATED DRIVES

(71) Applicant: MURATA MANUFACTURING CO., LTD., Nagaokakyo (JP)

(72) Inventors: Matti Liukku, Helsinki (FI); Altti Torkkeli, Tuusula (FI); Anssi Blomqvist, Helsinki (FI)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 287 days.

(21) Appl. No.: 16/896,324

(22) Filed: Jun. 9, 2020

(65) Prior Publication Data

US 2020/0386985 A1 Dec. 10, 2020

(30) Foreign Application Priority Data

Jun. 10, 2019 (FI) .................................. 20195491

(51) Int. Cl.
*G02B 26/08* (2006.01)
*G01S 7/481* (2006.01)
*G02B 26/10* (2006.01)

(52) U.S. Cl.
CPC ........ *G02B 26/0858* (2013.01); *G01S 7/4817* (2013.01); *G02B 26/105* (2013.01)

(58) Field of Classification Search
CPC .............. G02B 26/0858; G02B 26/105; G02B 26/101; G01S 7/4817
See application file for complete search history.

(56) References Cited

U.S. PATENT DOCUMENTS

| | | |
|---|---|---|
| 2007/0047046 A1 | 3/2007 | Ji |
| 2011/0194164 A1 | 8/2011 | Chou et al. |
| 2012/0236379 A1* | 9/2012 | da Silva ............ G02B 26/0841 359/200.8 |
| 2013/0208330 A1* | 8/2013 | Naono ............... G02B 26/0858 359/200.1 |
| 2016/0006330 A1 | 1/2016 | Fujimoto |
| 2019/0064508 A1* | 2/2019 | Torkkeli ............... G02B 26/101 |

(Continued)

FOREIGN PATENT DOCUMENTS

| | | |
|---|---|---|
| CN | 108761773 A | 11/2018 |
| JP | 2010-128116 A | 6/2010 |

(Continued)

OTHER PUBLICATIONS

European Search Report dated Sep. 29, 2020 corresponding to European Patent Application No. 20174120.

(Continued)

*Primary Examiner* — Michael Lee
(74) *Attorney, Agent, or Firm* — Squire Patton Boggs (US) LLP (57) ABSTRACT

The invention relates to microelectromechanical systems (MEMS), and specifically to a mirror system, for example to be used in LiDAR (Light Detection and Ranging). The MEMS mirror system of the invention uses four suspenders, each of which is connected to the reflector body at two separate connection points which can be independently displaced by piezoelectric actuators. By actuating adjacent and opposite pairs of piezoelectric actuators, the reflector body can be driven to oscillated about two orthogonal axes.

17 Claims, 7 Drawing Sheets

(56) References Cited

U.S. PATENT DOCUMENTS

2020/0271920 A1* 8/2020 Hirata .................... G01S 7/481
2020/0393545 A1* 12/2020 Shani .................... G01S 17/894

FOREIGN PATENT DOCUMENTS

| JP | 2013080208 A | * | 5/2013 |
| WO | WO 2018/230065 A1 | | 12/2018 |
| WO | WO 2019/106429 A2 | | 6/2019 |
| WO | WO 2019/106429 A3 | | 6/2019 |

OTHER PUBLICATIONS

Finnish Search Report dated Feb. 7, 2020 corresponding to Finnish Patent Application No. 20195491.

* cited by examiner

TWO-AXIS MEMS MIRROR WITH SEPARATED DRIVES

TECHNICAL FIELD

The present invention relates to microelectromechanical systems (MEMS), and specifically to a mirror system for use in LiDAR (Light Detection and Ranging).

BACKGROUND

Scanning microelectromechanical (MEMS) reflectors can be used in imaging devices such as light-detection and ranging sensors (LIDARs). A scanning MEMS reflector may contain at least one moving reflector which can reflect light beams from a laser emitter towards the surrounding environment. Additional fixed reflectors may be included in the light path between the moving reflector and the environment. Returning light beams can be reflected inward towards a photodetector by the same fixed reflectors and moving reflector which reflected the outgoing beam.

In order to emit and pick up light beams over a broad imaging area (the field of view), a MEMS reflector must be tilted back and forth. The imaging area of a MEMS reflector is in part determined by how much the moving reflector can be tilted. In simple implementations, MEMS reflectors can be configured to tilt about only one axis. The resulting oscillation mode, where the mirror scans a planar angle centred on the tilting axis, may be called one-axis tilting oscillation.

Figure 1:
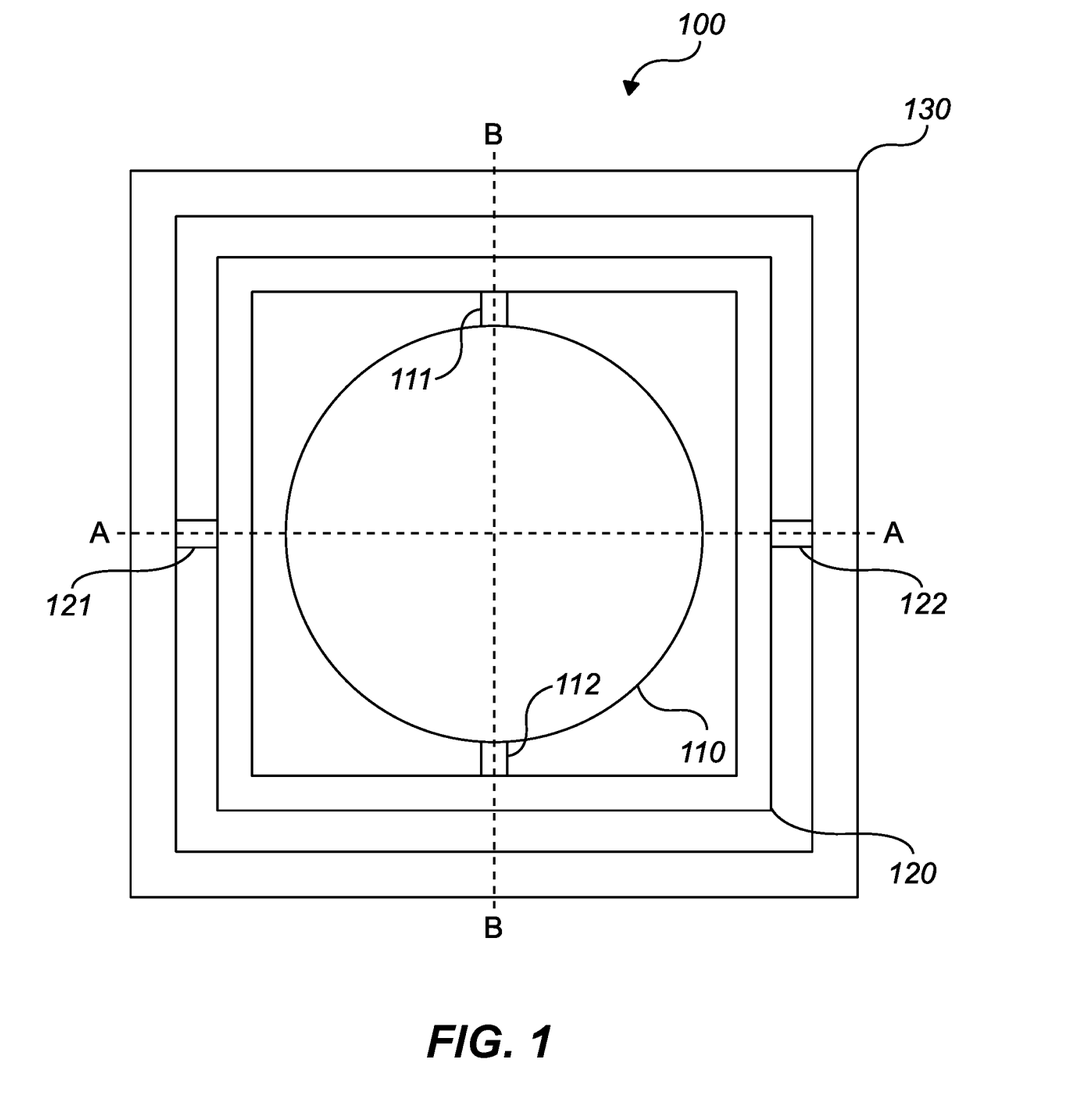
FIGS. 1 and 2 show exemplary two-axis MEMS mirror systems.

In more complex implementations the reflector may perform scanning motion across a solid angle. FIG. 1 illustrates a MEMS mirror system 100 in which the reflector 110 is attached to a rotatable gimbal frame 120. The gimbal frame 120 may rotate in relation to a fixed frame 130 about the axis A-A between its fixing points 121 and 122. The reflector 110 may in turn rotate in relation to the gimbal frame 120 about the axis B-B between its fixing points 111 and 112. The resulting oscillation mode may be called two-axis tilting oscillation. The amplitude of the tilt of the reflector 110 can typically be maximized by driving the actuating force at a frequency which corresponds to the resonance frequency of the oscillation. In LIDAR applications, this frequency may be in the range 0.5 kHz-5 kHz. The actuators which set the reflector in oscillation may be piezoelectric or capacitive actuators. By selecting appropriate resonant frequencies in the two modes of oscillation, the trajectory traced by the reflector 110 (i.e. the path traced by a stationary beam reflected from the surface of the moving reflector 110) is a Lissajous curve. The shape of a Lissajous curve is highly sensitive to the ratios of the frequencies of oscillation in each mode.

In the case of the mirror system 100 of FIG. 1, the resonance frequency of each of the two modes of oscillation, i.e. oscillation of the reflector 110 about the axis B-B and oscillation of the reflector 110 and gimbal frame 120 about axis A-A, are significantly different due to the different masses of the reflector 110 on its own, and the reflector 110 plus gimbal frame 120. Furthermore, the resonance frequencies of the two modes are sensitive to temperature and other environmental factors. Thus, when the temperature changes, the difference between the two resonance modes also changes, in proportion with the frequency difference between the two resonance modes, i.e. a larger difference in resonance frequencies results in a larger variation of the ratio of the resonance frequencies as the temperature changes. This results in significant changes to the Lissajous curve traced by the reflector 110 at different temperatures, and therefore significantly changes the scanning behaviour of the reflector when used, for example, in LiDAR. Thus, in a gimbal-based system such as mirror system 100, complex frequency tuning components and electronics are required in order to counter the problems caused by temperature change.

Figure 2:
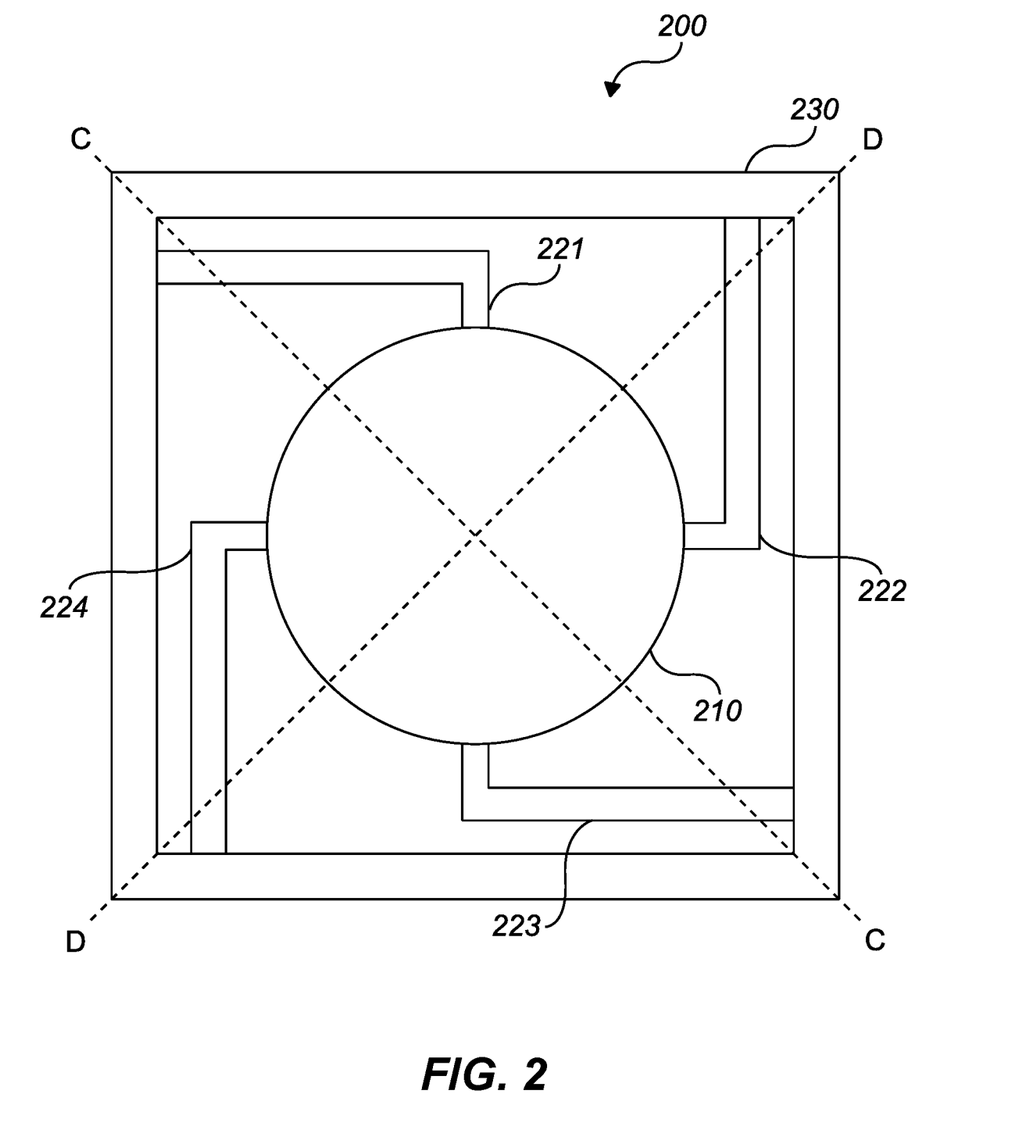

FIG. 2 illustrates a second two-axis MEMS mirror system 200 for scanning a solid angle, where the reflector 210 is suspended from the fixed frame 230 by bendable and/or partly mobile suspenders 221-224. These suspenders may be coupled to force actuators. These actuators can create quasi-rotational reflector movement by lifting and lowering the fixing points on the edge of the reflector in a suitably synchronized and coordinated manner. The resulting oscillation mode may be called wobbling oscillation. In theory, it should be possible to rotate the reflector 210 about a vertical axis by raising suspender 221 and lowering suspender 223 and vice versa, and similarly rotate the reflector about a horizontal axis by raising suspender 222 and lowering suspender 224 and vice versa. Furthermore, the resonance frequencies of the two modes of oscillation are more closely matched than in the gimbal-based system 100. However, in practice, the isolation of these rotation modes is not perfect, due to manufacturing imperfections. Thus, the oscillation modes of such a device tend to be about diagonal axes C-C and D-D shown in FIG. 2. Thus, actuation of all four suspenders 221-224 is required in both modes of oscillation, which is significantly more complicated than the gimbal arrangement of FIG. 1, where the two modes of oscillation and control thereof can be easily separated.

SUMMARY OF THE INVENTION

According to a first aspect of the invention, a micromechanical reflector system is provided. The micromechanical reflector system comprises one or more supports and a reflector body. The reflector body is suspended from the one or more supports by a plurality of suspenders. The invention is characterised in that each suspender comprises an outer section, a middle section and an inner section, in which:
- the outer section is fixed at a first end to one of the one or more supports and is connected at the second end to the middle section,
- the outer section extends from the support in a first direction around a portion of the perimeter of the reflector body to the middle section;
- the inner section is disposed between the outer section and the reflector and is connected at a first end to the middle section,
- the inner section extends from the middle section in a second direction, opposite to the first direction, around at least part of the portion of the perimeter of the reflector body;
- the reflector body is connected to the suspender at the middle section and a second end of the inner section distal to the middle section; and
- a first piezoelectric actuator is located on the outer section and a second piezoelectric actuator is located on the inner section.

Preferably, the micromechanical reflector system comprises four suspenders.

The reflector body may be configured to partially rotate about two orthogonal rotation axes, wherein the rotation axes are located in the plane of the reflector body and intersect at the centre of the reflector body.

The rotation axes may be located between the suspenders.

The suspenders are preferably arranged equidistantly around the perimeter of the reflector body such that, in each pair of adjacent suspenders, the suspenders are arranged as mirror images reflected about the rotation axis located between the suspenders.

When the suspenders are arranged as mirror images, the reflector system may be configured to drive oscillation of the reflector body about a first rotation axis of the rotation axes by:

actuating the piezoelectric actuator of the outer section of a first suspender and actuating the piezoelectric actuator of the outer section of a second suspender such that a first side of the reflector body is displaced upwards relative to the plane of the reflector body, wherein the middle section of the first suspender and the middle section of the second suspender are adjacent; and actuating the piezoelectric actuator of the outer section of a third suspender and actuating the piezoelectric actuator of the outer section of a fourth suspender such that a second side of the reflector body is displaced downwards relative to the plane of the reflector body, wherein the second side of the reflector body is opposite to the first side of the reflector body, and wherein the middle section of the third suspender and the middle section of the fourth suspender are adjacent.

When the suspenders are arranged as mirror images, the reflector system may be configured to drive oscillation of the reflector body about a second rotation axis of the rotation axes by:

actuating the piezoelectric actuator of the inner section of the first suspender and actuating the piezoelectric actuator of the inner section of the fourth suspender such that a third side of the reflector body is displaced upwards relative to the plane of the reflector body; and actuating the piezoelectric actuator of the inner section of the second suspender and actuating the piezoelectric actuator of the inner section of the third suspender such that a fourth side of the reflector body is displaced downwards relative to the plane of the reflector body, wherein the fourth side of the reflector body is opposite to the third side of the reflector body.

Alternatively, the suspenders may be arranged equidistantly around the perimeter of the reflector body, each suspender is a 90-degree rotation of its adjacent suspenders.

When the suspenders are arranged as 90-degree rotations if the adjacent suspenders, the reflector system may be configured to drive oscillation of the reflector body about a first rotation axis of the rotation axes by:

actuating the piezoelectric actuator of the outer section of a first suspender and actuating the piezoelectric actuator of the inner section of a second suspender such that a first side of the reflector body is displaced upwards relative to the plane of the reflector body, wherein the middle section of the first suspender and the middle section of the second suspender are adjacent; and actuating the piezoelectric actuator of the outer section of a third suspender and actuating the piezoelectric actuator of the inner section of a fourth suspender such that a second side of the reflector body is displaced downwards relative to the plane of the reflector body, wherein the second side of the reflector body is opposite to the first side of the reflector body, and wherein the middle section of the third suspender and the middle section of the fourth suspender are adjacent.

When the suspenders are arranged as 90-degree rotations if the adjacent suspenders, the reflector system may be configured to drive oscillation of the reflector body about a second rotation axis of the rotation axes by:

actuating the piezoelectric actuator of the outer section of the fourth suspender and actuating the piezoelectric actuator of the inner section of the first suspender such that a third side of the reflector body is displaced upwards relative to the plane of the reflector body; and actuating the piezoelectric actuator of the outer section of the second suspender and actuating the piezoelectric actuator of the inner section of the third suspender such that a fourth side of the reflector body is displaced downwards relative to the plane of the reflector body, wherein the fourth side of the reflector body is opposite to the third side of the reflector body.

Each suspender may further comprise a first spring that connects the inner section to the reflector body and a second spring that connects the middle section to the reflector body.

Alternatively, each pair of adjacent suspenders is connected via a single spring to the reflector body.

The reflector body may comprise weight areas disposed at opposite sides of the reflector body and between each pair of suspenders.

The suspenders may be connected to the reflector body via the weight areas.

The suspenders may be connected to the reflector body via torsion springs.

Preferably, the middle section of each suspender is stiffer than the inner and outer sections of the suspender.

Preferably, in each suspender, the first piezoelectric actuator is located close to or at the first end of the outer section, and wherein the second piezoelectric actuator is located close to or at the first end of the inner section.

Preferably, in each suspender, one or more sense electrodes are located parallel to and alongside the piezoelectric actuators.

DETAILED DESCRIPTION

Figure 3:
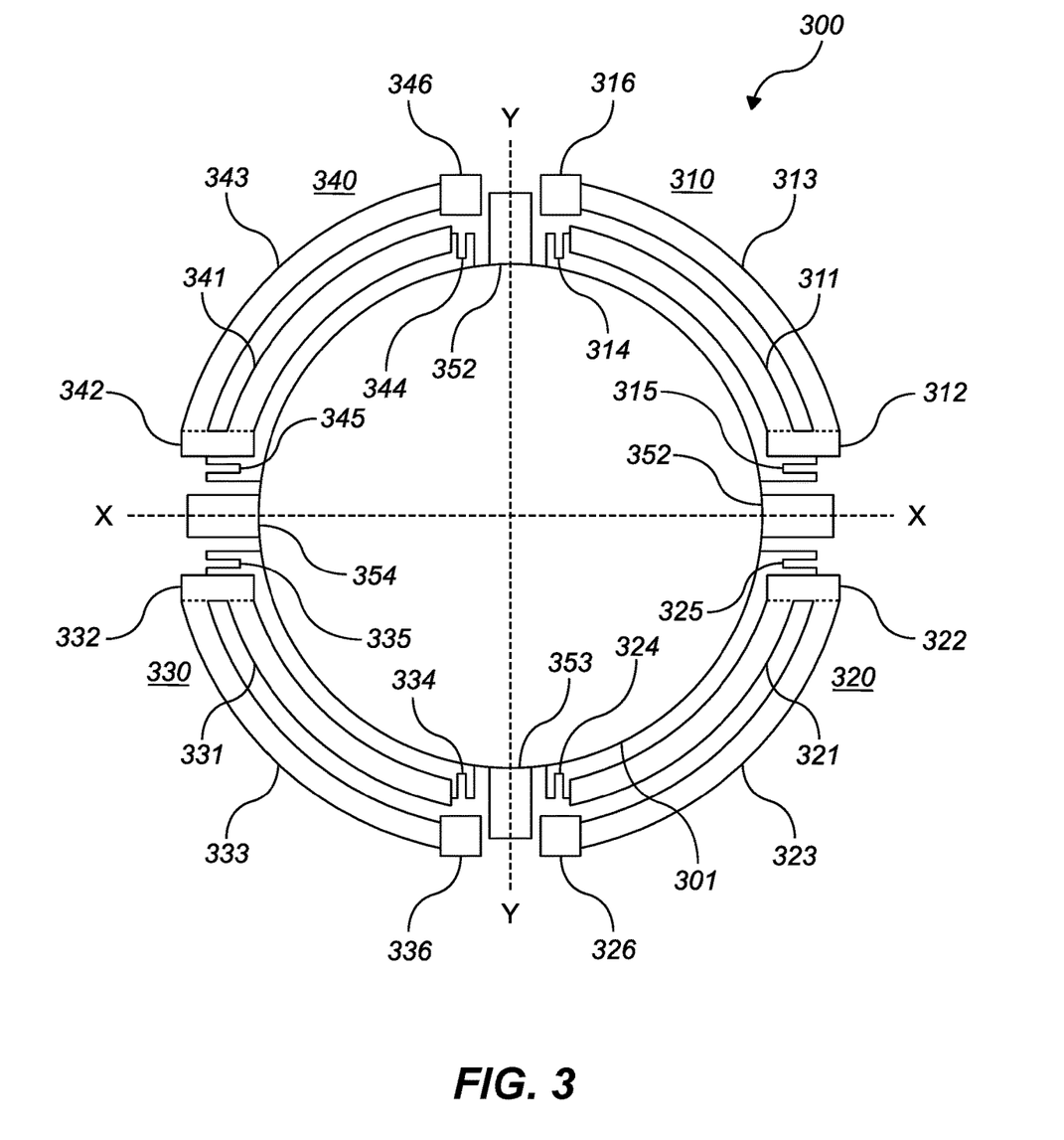
FIG. 3 shows a first embodiment of a two-axis MEMS mirror system according to the present invention.

FIG. 3 depicts a first embodiment of the two-axis MEMS mirror system 300 of the present invention. The MEMS mirror system 300 includes a reflector body 301, which is suspended from the device, e.g. from a frame surrounding the system MEMS mirror system 300, by four suspenders 310, 320, 330 and 340. Each suspender is made up of an inner section 311, 321, 331, 341, a middle section 312, 322, 332, 342, and an outer section 313, 323, 333, 343. A first suspender 310 includes a first inner section 311, first middle section 312 and first outer section 313. Second suspender 320 includes second inner section 321, second middle section 322 and second outer section 323. Third suspender 330 includes third inner section 331, third middle section 332 and third outer section 333. Fourth suspender 340 includes fourth inner section 341, fourth middle section 342 and fourth outer section 343.

The inner section, middle section and outer section of each suspender may be formed as a single element, e.g. formed from a continuous piece of silicon, or may be different materials or from the same material having different physical properties, such as Young's modulus, which are joined together to produce the suspender. For example, the middle section may be formed from a stiffer material than the inner and outer sections, or may have different dimensions, e.g. be thicker in the Z direction, than the inner and outer sections in order to provide greater stiffness. In particular, the middle section of the suspender should be stiff enough in order to cause deformation of the inner section to displace the reflector body 301, rather than simply deflecting the middle section. Furthermore, while the middle section of the suspenders has been depicted as only the transverse portion of the suspender, i.e. the portion of the suspender that is perpendicular to the inner and outer sections and to the perimeter of the reflector body, it will be understood that the middle section may indeed extend further than is depicted in the drawings. Indeed, the middle section is defined by its function—joining the inner and outer sections with sufficient stiffness—and position—between the actuators of the inner and outer sections—rather than by its specific shape.

Each suspender is connected to the reflector body 310 at the middle section 312, 322, 332, or 342 via a spring 315, 325, 335, or 345, and at the distal end of the inner section 311, 321, 331, 341 (i.e. the end of the inner section furthest away from the middle section) via another spring 314, 324, 334, or 344. At a distal end of the outer section 313, 323, 333, 343 (i.e. the end of the outer section further away from the middle section), the outer section is connected via anchor point 316, 326, 336, 346 to the body of the MEMS mirror system package, e.g. to a frame surrounding the MEMS mirror system 300.

In FIG. 3, the reflector body 301 is circular, and the inner sections 311, 321, 331 and 341 and outer sections 313, 323, 333 and 343 of the suspenders 310-340 are curved or substantially arc-shaped, extending around portions of the perimeter of the reflector body 301. Consequently, the surface area occupied by the control apparatus of MEMS mirror system 300, i.e. the suspenders, is reduced and the size of the reflector body 301 can be increased for a given package size. However, the shape of the reflector body 301 is not necessarily circular and may, for example, be oblong, e.g. elliptical or rectangular, in order to fine-tune the resonance frequency using the mass of the reflector itself, instead of the mass regions 351-354, as described in more detail below. Furthermore, using an oblong reflector instead of the mass regions to fine-tune the resonance frequency provides a greater surface area of the reflector and therefore a greater projected area for a light source with a large angle of incidence. Of course, when the reflector body is not circular, the suspenders 310-340 may not be circularly arc-shaped but may instead be shaped to follow the perimeter of the reflector body, e.g. elliptically arc-shaped.

The suspenders 310-340 are positioned regularly around the perimeter of the reflector body 301. In the embodiment of FIG. 3, and adjacent suspenders are mirror-images of each other: the first suspender formed from elements 310 is a mirror-image of the fourth suspender 340, reflected about the Y-Y axis, and is also a mirror-image of the second suspender 320, reflected about the X-X axis. In this way, the springs 314, 324, 334 and 344 connecting each suspender, via the inner sections 311, 321, 331 and 341, to the reflector body 301 are located close to the Y-Y axis at opposite sides of the reflector body 310. Similarly, springs 315, 325, 335 and 345 connecting each suspender, via the middle sections 312, 322, 324 and 324, are located close to the X-X axis on opposite sides of the reflector body. FIG. 7 depicts an alternative embodiment in which the suspenders are not mirror-images of each other. In the embodiment of FIG. 3 (and FIGS. 5 and 6), arranging the suspenders as mirror-images enables the use of the same section (i.e. inner and outer sections) of adjacent suspenders to drive oscillation of the reflector body, as described in more detail below. Consequently, essentially the same drive signal can be applied to both suspenders to produce the same displacement of the inner or outer section.

The springs 314, 324, 334, 344 and 315, 325, 335, 345 should be loose in the X-Y plane, because the springs must become longer when reflector body 301 has high tilt and in torsional movement (i.e. reflector tilting). Loose springs in the X-Y plane prevent the springs from breaking when the reflector tilting is large. However, the springs should be more rigid in Z, i.e. out of the X-Y plane shown in FIG. 3, in order for the drive force produced by the displacement of the inner and outer sections of the suspenders to be effectively transferred to the reflector body 301.

Since reflector bodies are not perfectly stiff, during oscillation a reflector body typically deforms. In the reflectors shown in FIGS. 1 and 2, force is applied to the reflector body at relatively few (two or four) points, which increases the extend of the deformation of the reflector body. In contrast, the MEMS mirror system 300 of the present invention includes eight attachment points between the reflector body 301 and suspenders 310-340. This reduces the magnitude of the force applied the reflector body at any single attachment point, thereby reducing the magnitude of dynamic deformations of the reflector body 301 during oscillation. This is, of course, particularly important in application such as LiDAR, where precise knowledge and control of the angles of reflection of incoming and outgoing light is required.

In the MEMS mirror system package, the space above and below the reflector body 301, i.e. above and below the plane of the drawing in FIG. 3, is free from obstructions that would prevent oscillation of the reflector body 310 about the X-X and Y-Y axes. A central support structure to prevent oscillation of the reflector body 301 in the "piston mode" i.e. translation of the reflector body in the Z direction, may be provided in the space above and/or below the reflector body. Such a central support structure is described in more detail in US patent application publication number US 2019/0146211 A1, the disclosure of which is hereby incorporated by reference.

Each inner section 311, 321, 331, 341 and each outer section 313, 323, 333, 343 includes an actuation electrode, for example a piezoelectric actuator, that causes deflection of the inner or outer section out of the X-Y plane depicted in FIG. 3 when the appropriate electrical stimulus is applied. Each inner section 311, 321, 331, 341 and each outer section 313, 323, 333, 343 also includes a sense electrode configured to sense the deflection of the inner section or outer section. The actuation and sense electrodes are depicted in more detail in FIG. 4.

In operation, oscillation of the reflector body 301 about the X-X axis and Y-Y axis is driven by stimulation of the actuation electrodes in the inner sections 311, 321, 331, 341 and outer sections 313, 323, 333, 343. Specifically, to drive oscillation about the X-X axis, the actuation electrodes of inner sections 311 and 341 are driven 180 degrees out of phase with the actuation electrodes of inner sections 321 and 331, i.e. when the actuation electrodes of inner sections 311 and 341 cause the reflector body 301, at the attachment points of springs 314 and 344, to move above the X-Y plane, the actuation electrodes of inner section 321 and 331 is driven such that the reflector body 301, at the attachment points of springs 324 and 334, moves below the X-Y plane, and vice versa. This alternating actuation of the inner sections 311, 341 and 321, 331 causes the reflector body to oscillate about the X-X axis. Oscillation about the X-X axis, also referred to as the X resonance mode, can therefore be excited differentially according to the equation:

$$\text{Drive}_X = (\text{Drive}_{311} + \text{Drive}_{341}) - (\text{Drive}_{321} + \text{Drive}_{331})$$

Similarly, the X resonance mode can be sensed differentially using the equation:

$$\text{Sense}_X = (\text{Sense}_m + \text{Sense}_{341}) - (\text{Sense}_{321} + \text{Sense}_{331})$$

Oscillation of the reflector body 301 about the Y-Y axis is driven by stimulation of the actuation electrodes of the outer sections 313, 323, 333 and 343. The actuation electrodes of outer sections 313 and 323 are driven 180 degrees out of phase with the actuation electrodes of outer sections 333 and 343, i.e. when the actuation electrodes of outer sections 313 and 323 cause the reflector body 301, at the attachment points of springs 315 and 325, to move above the X-Y plane, the actuation electrodes of outer sections 333 and 334 are driven such that the reflector body 301, at the attachment points of springs 335 and 345, moves below the X-Y plane, and vice versa. This alternating actuation of the outer sections 313, 323 and 333, 343 causes the reflector body to oscillate about the Y-Y axis. Oscillation about the Y-Y axis, also referred to as the Y resonance mode, can therefore be excited differentially according to the equation:

$$\text{Drive}_Y = (\text{Drive}_{313} + \text{Drive}_{323}) - (\text{Drive}_{333} + \text{Drive}_{343})$$

Similarly, the Y resonance mode can be sensed differentially using the equation:

$$\text{Sense}_Y = (\text{Sense}_{313} + \text{Sense}_{323}) - (\text{Sense}_{333} + \text{Sense}_{343})$$

In order to produce a Lissajous pattern suitable for scanning, e.g. in a LiDAR system, the frequencies of the X resonance mode and Y resonance mode must be selected appropriately. Thus, the MEMS reflector 300 also includes mass regions 351, 352, 353 and 354. These mass regions are fixed to the reflector body 301 at the perimeter of the reflector body 301 and are positioned between each of the suspenders. The mass regions 351-354 are thus space equidistantly around the perimeter of the reflector body 301 and are each located and centred along one of the axes X-X or Y-Y, with two mass regions on each axis at opposite sides of the reflector body 301. The size, i.e. the mass, of each of the mass regions 351-354 can be adjusted in order to tune the resonance frequencies of the X resonance mode and the Y resonance mode independently at the manufacturing stage. In contrast the gimbal structure depicted in FIG. 1, the resonance frequencies of the X resonance mode and the Y resonance mode of the MEMS mirror system 300 are much more closely matched, since the inertial mass of the reflector 310 that must be moved in each resonance mode is essentially the same. Thus, the resonance frequencies of the X resonance mode and the Y resonance mode can be selected to be relatively close, minimising the effect of environmental changes on the relative differences between the resonance frequencies and removing the need for complicated adaptive tuning elements and circuitry in the MEMS mirror system 300.

Figure 4:
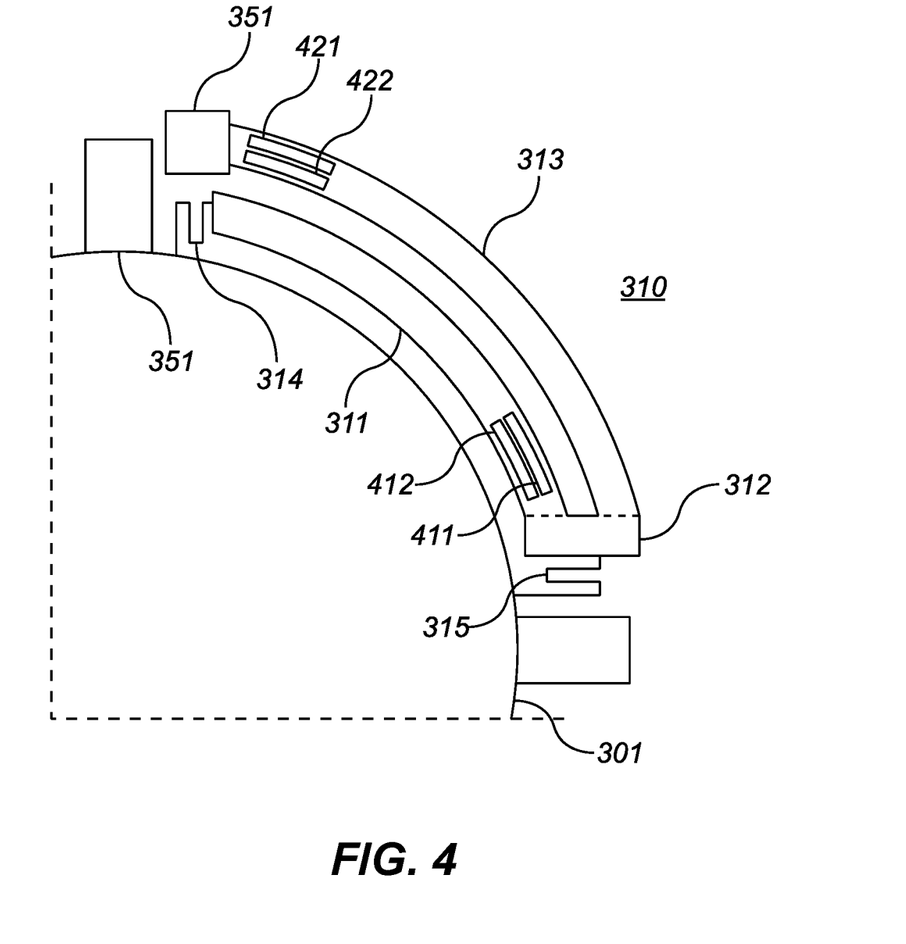
FIG. 4 shows a detailed view of a suspender according to the present invention.

FIG. 4 depicts the suspender 310 of FIG. 3 in more detail. In particular, FIG. 4 shows the actuation electrodes 411 and 421 and sense electrodes 412 and 422 of the inner section 311 and outer section 313. The same configuration of the electrodes 411, 412, 421 and 422 is present in each of the suspenders 310-340 show in FIG. 3, and in the suspenders of the alternative embodiments described in more detail below. It will be appreciated that where a given suspender is a mirror image of the suspender 310 shown in FIG. 4, the positions of the sense electrodes remains the same relative to the other elements of the suspender. Specifically, the inner actuation electrode 411 and inner sense electrode 412 are arrange side-by-side in parallel along the length of the inner section 311 and are located close to or at the end of the inner section that is adjacent to the middle section 312. The outer actuation electrode 421 and outer sense electrode 422 are located side-by-side and in parallel along the length of the outer section 313 and are located close to or at the end of the outer section 313 adjacent to the anchor point 351.

The positions of the actuation electrodes 411 and 421 at the ends of the inner section 311 and outer section 313 respectively provides the most efficient drive excitation. It can be seen from modelled stress patterns of the reflector and suspends that the maximum stress in the inner section 311 and outer section 313 occurs at the opposite end of each section to where the spring (and therefore the reflector body) is joined. Thus, placing actuation electrodes, such as piezoelectric electrodes, which produce stress, at these points provides the maximum efficiency. Furthermore, in order to accurately measure the deflection provided by the actuation electrodes 411, 421, the sense electrodes 412, 422 are located alongside the actuation electrodes in order to directly measure the deflection in the location of the actuation electrodes.

Figure 5:
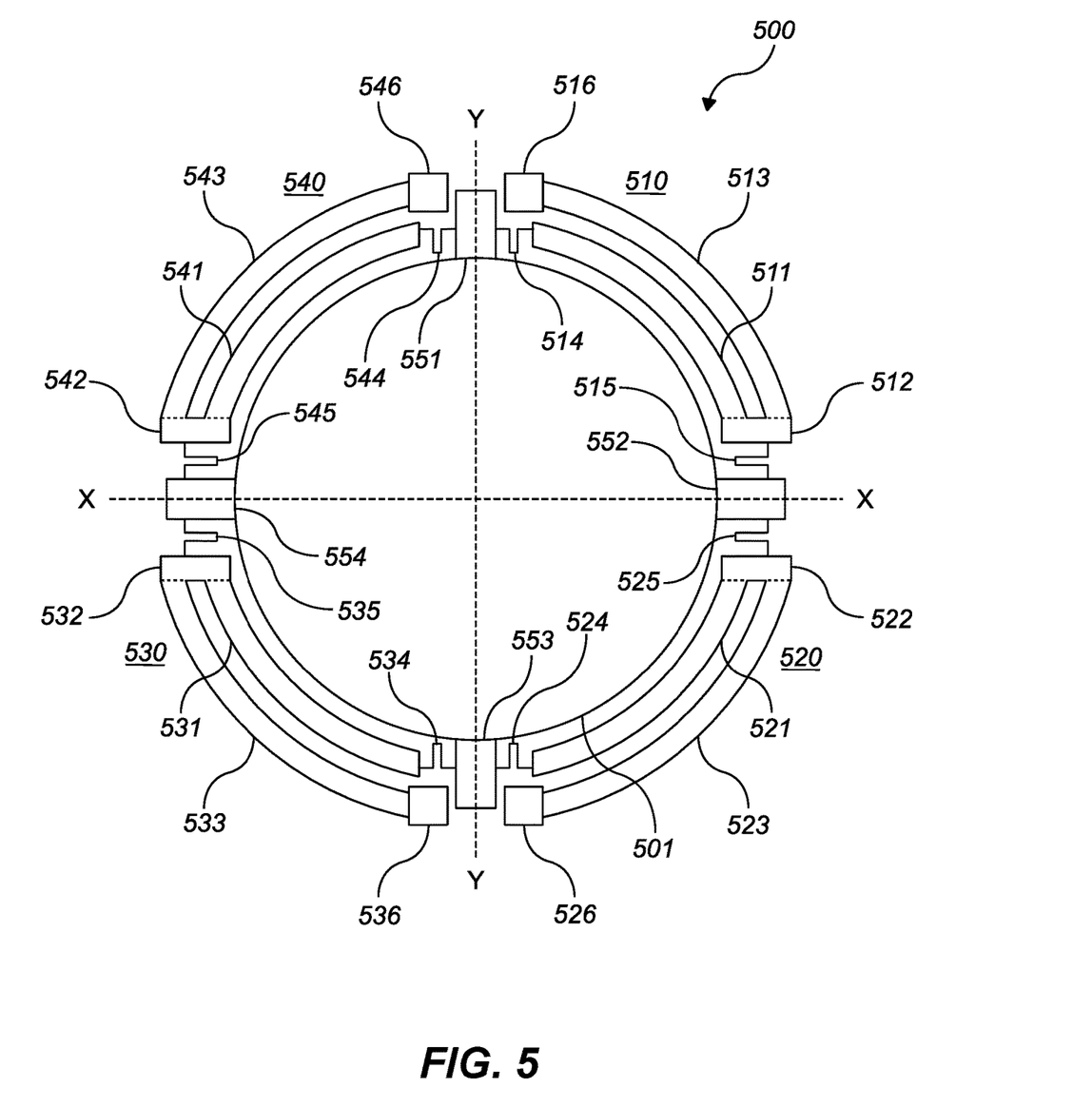
FIG. 5 shows a second embodiment of a two-axis MEMS mirror system according to the present invention.
Figure 6:
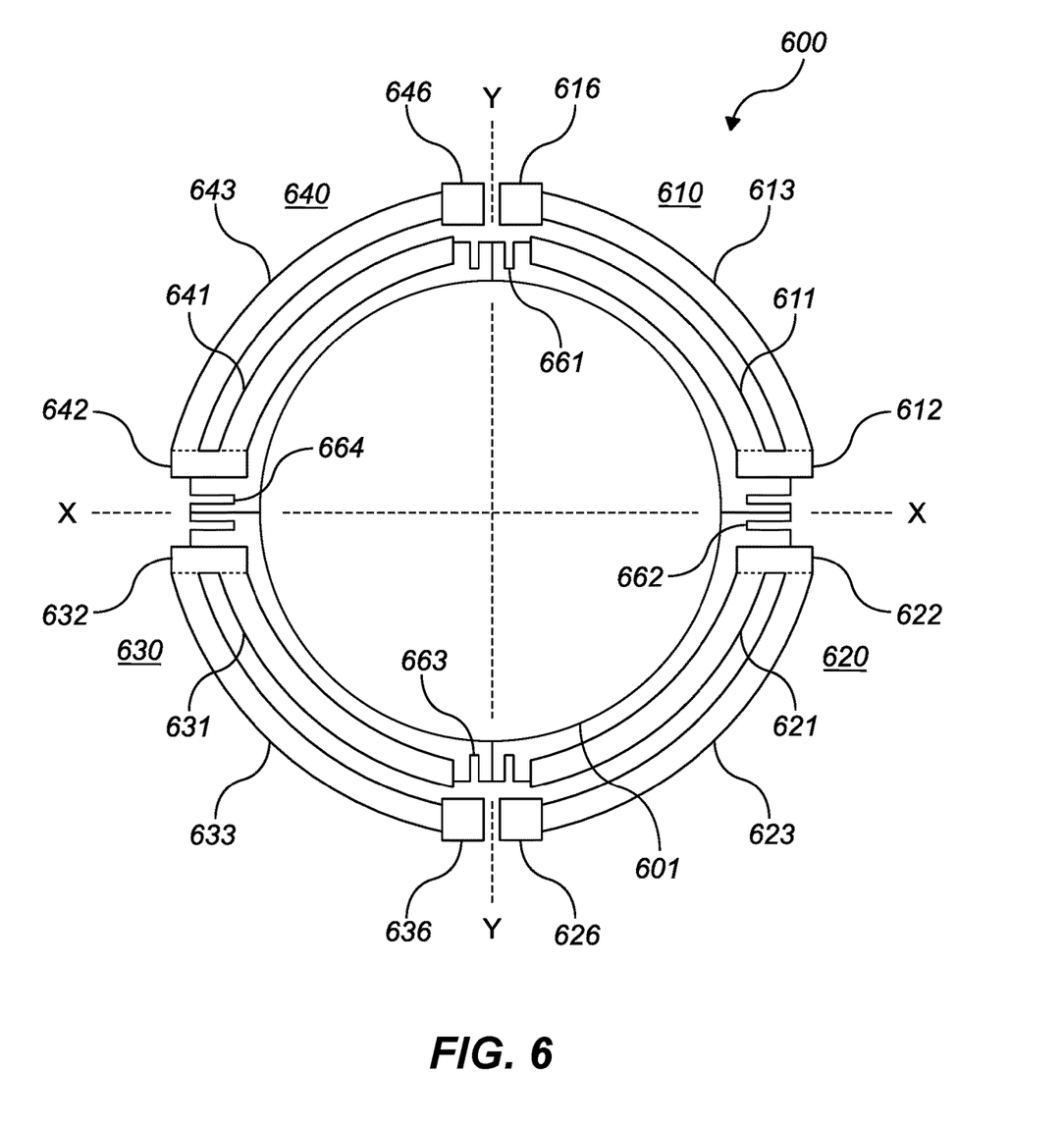
FIG. 6 shows a third embodiment of a two-axis MEMS mirror system according to the present invention.
Figure 7:
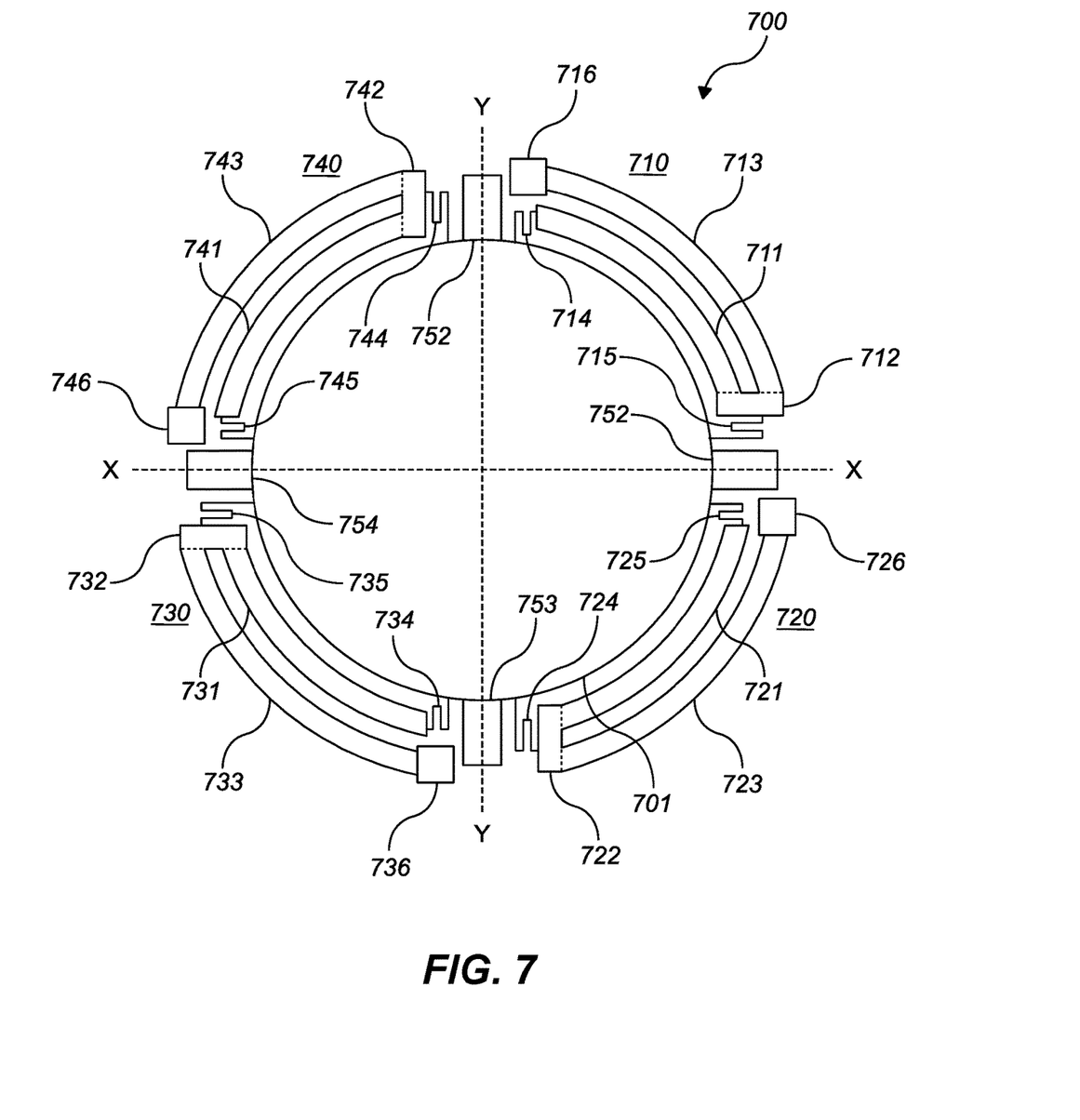
FIG. 7 shows a fourth embodiment of a two-axis MEMS mirror system according to the present invention.

As mentioned above, alternative embodiments of the invention are depicted in FIGS. 5 and 6. In the MEMS reflector 500 of FIG. 5, the springs 514, 524, 534 and 544 connect inner sections 511, 521, 531 and 541 to the weight areas 551-554 instead of the to the reflector body 501, as in reflector 300 shown in FIG. 3. Similarly, springs 515, 525, 535 and 545 connect middle section 512, 522, 532 and 542 to the weight areas 551-554 instead of the reflector body 501. The other features of the MEMS reflector 500 are unchanged from the MEMS reflector 300 of FIG. 3. In this arrangement, the resonance frequencies of the X and Y resonance modes are lower than in the embodiment of FIG. 3, since the connection points between the suspenders and the reflector body are further away from the axes of rotation.

FIG. 6 depicts a third embodiment of a MEMS reflector 600 according to the present invention. The suspenders 610-640 are arranged in the same manner as in the first embodiment 300 and second embodiment 500; however, the MEMS reflector 600 of the third embodiment does not include mass regions, such as mass regions 351-354 in embodiment 300, and only has four connection points between the suspenders 610-640 and the reflector body 601. Adjacent suspenders, such as suspenders 610 and 640, share a common spring, i.e. spring 661, connecting the suspenders to the reflector body 601. Springs 661 and 663 join adjacent inner sections 611 and 641 of suspenders 610 and 640 and adjacent inner sections 621 and 631 of suspenders 620 and 630 to each other and to the reflector body 601 at opposite sides of the reflector body. Similarly, springs 662 and 664 join adjacent middle sections 612 and 622 of suspenders 610 and 620 and 632 and 642 of suspenders 630 and 640 to each other and to the reflector body 601 on opposite sides of the reflector body. Since, as described above, the resonant frequencies of the X and Y resonance modes are already similar, the mass regions of the previous embodiments may not be required in order to produce a suitable Lissajous scanning pattern. Furthermore, as explained above, the resonance frequencies of the X and Y mode can be fine-tuned by adjusting the size and shape of the reflector body 601. Thus, by removing the mass regions and connecting the suspenders 610-640 to the reflector body 601 in this way, the size of the control apparatus, i.e. the suspenders 610-640 and related mechanical elements, may be reduced further, allowing for an even bigger reflector or a smaller overall package size.

FIG. 7 depicts an alternative embodiment of a MEMS mirror system 700, corresponding to the embodiment depicted in FIG. 3, in which adjacent suspenders are not mirror-images, i.e. wherein each adjacent suspender is rotated by 90 degrees.

The reflector body 701, is suspended from the device, e.g. from a frame surrounding the system MEMS mirror system 700, by four suspenders 710, 720, 730 and 740. Each suspender is made up of an inner section 711, 721, 731, 741, a middle section 712, 722, 732, 742, and an outer section 713, 723, 733, 743.

Similarly to the other embodiment described herein, the inner section, middle section and outer section of each suspender may be formed as a single element, e.g. formed from a continuous piece of silicon, or may be different materials or from the same material having different physical properties, such as Young's modulus, which are joined together to produce the suspender. Furthermore, while the middle section of the suspenders has been depicted as only the transverse portion of the suspender, i.e. the portion of the suspender that is perpendicular to the inner and outer sections and to the perimeter of the reflector body, it will be understood that the middle section may indeed extend further than is depicted in the drawings.

Each suspender is connected to the reflector body 710 at the middle section 712, 722, 732, or 742 via a spring 715, 725, 735, or 745, and at the distal end of the inner section 711, 721, 731, 741 (i.e. the end of the inner section furthest away from the middle section) via another spring 714, 724, 734, or 744. At a distal end of the outer section 713, 723, 733, 743 (i.e. the end of the outer section further away from the middle section), the outer section is connected via anchor point 716, 726, 736, 746 to the body of the MEMS mirror system package, e.g. to a frame surrounding the MEMS mirror system 700. In comparison to the embodiment of FIG. 3, since the anchor points 716, 726, 736 and 746 are arranged regularly around the perimeter of the MEMS reflector 700, the sensitivity of the system to external linear vibration, especially in X-direction is reduced.

The suspenders 710-740 are positioned regularly around the perimeter of the reflector body 701. In the embodiment of FIG. 7, adjacent suspenders are not mirror-images of each other. Instead, each suspender is rotated by 90 degrees with respect to its adjacent suspenders. The first suspender formed from elements 710 is a 90 degree clockwise rotation of the fourth suspender 740, the second suspender 720 is a 90 degree clockwise rotation of the first suspender 710, the third suspender is a 90 degree clockwise rotation of the second suspender 720, and the fourth suspender 740 is a 90 degree rotation of the third suspender 730. In this way, the springs 714 and 734 connect the first suspender 710 and third suspender 730, via the inner sections 711 and 731, to the reflector body 701 close to the Y-Y axis. Springs 724 and 744 connect the second suspender 720 and fourth suspender 740, via the middle sections 722 and 742, to the reflector body 701 close to the Y-Y axis. Similarly, the springs 715 and 735 connect the first suspender 710 and third suspender 730, via the middle sections 712 and 732, to the reflector body 701 close to the X-X axis, and springs 725 and 745 connect the second suspender 720 and fourth suspender 740, via the inner sections 721 and 741, to the reflector body 701 close to the X-X axis.

As explained above, the springs 714, 724, 734, 744 and 715, 725, 735, 745 should be loose in the X-Y plane, because the springs must become longer when reflector body 71 has high tilt and in torsional movement (i.e. reflector tilting).

As in the other described embodiments, each inner section 711, 721, 731, 741 and each outer section 713, 723, 733, 743 includes an actuation electrode, for example a piezoelectric actuator, that causes deflection of the inner or outer section out of the X-Y plane depicted in FIG. 7 when the appropriate electrical stimulus is applied. Each inner section 711, 721, 731, 741 and each outer section 713, 723, 733, 743 also includes a sense electrode configured to sense the deflection of the inner section or outer section. The actuation and sense electrodes are depicted in more detail in FIG. 4.

In operation, oscillation of the reflector body 701 about the X-X axis and Y-Y axis is driven by stimulation of the actuation electrodes in the inner sections 711, 721, 731, 741 and outer sections 713, 723, 733, 743. Specifically, to drive oscillation about the X-X axis, the actuation electrodes of inner section 711 and outer section 743 are driven 180 degrees out of phase with the actuation electrodes of inner section 731 and outer section 723. To drive oscillation about the Y-Y axis, the actuation electrodes of outer sections 713 and inner section 721 are driven 180 degrees out of phase with the actuation electrodes of outer section 733 and inner section 741.

As described above, to produce a Lissajous pattern suitable for scanning, e.g. in a LiDAR system, the frequencies of the X resonance mode and Y resonance mode must be selected appropriately. Thus, the MEMS reflector 700 also includes mass regions 751, 752, 753 and 754.

While embodiment 7 depicts a MEMS reflector 700 corresponding to the reflector of FIG. 3 with non-mirrored suspenders, it will be appreciated that the other embodiment of FIGS. 5 and 6 may also be provided with non-mirrored suspenders.

The invention claimed is:
1. A micromechanical reflector system comprising:
one or more supports; and
a reflector body, wherein the reflector body is suspended from the one or more supports by four suspenders, and each suspender of the suspenders comprises an outer section, a middle section, and an inner section, wherein:
the outer section is fixed at a first end to one of the one or more supports and is connected at a second end to the middle section, and the outer section extends from the support of the one or more supports in a first direction around a portion of a perimeter of the reflector body to the middle section;
the inner section is disposed between the outer section and the reflector body and is connected at a first end to the middle section, and the inner section extends from the middle section in a second direction, opposite to the first direction, around at least part of the portion of the perimeter of the reflector body;
the reflector body is connected to each suspender at the middle section and a second end of the inner section distal to the middle section;
a first piezoelectric actuator is located on the outer section of each suspender to deflect the outer section out of a plane of the reflector body; and a second piezoelectric actuator is located on the inner section of each suspender to deflect the inner section out of the plane of the reflector body.

2. The micromechanical reflector system of claim 1, wherein the reflector body is configured to partially rotate about two orthogonal rotation axes, and the rotation axes are located in the plane of the reflector body and intersect at a center of the reflector body.

3. The micromechanical reflector system of claim 2, wherein the rotation axes are located between the suspenders.

4. The micromechanical reflector system of claim 1, wherein the suspenders are arranged equidistantly around the perimeter of the reflector body, and wherein in each pair of adjacent suspenders, the suspenders are arranged as mirror images reflected about the rotation axis located between the suspenders.

5. The micromechanical reflector system of claim 4, wherein the micromechanical reflector system is configured to drive oscillation of the reflector body about a first rotation axis of the rotation axes by:
actuating the first piezoelectric actuator of the outer section of a first suspender of the suspenders and actuating the first piezoelectric actuator of the outer section of a second suspender of the suspenders such that a first side of the reflector body is displaced upwards relative to the plane of the reflector body, wherein the middle section of the first suspender and the middle section of the second suspender are adjacent; and
actuating the first piezoelectric actuator of the outer section of a third suspender of the suspenders and actuating the first piezoelectric actuator of the outer section of a fourth suspender of the suspenders such that a second side of the reflector body is displaced downwards relative to the plane of the reflector body, wherein the second side of the reflector body is opposite to the first side of the reflector body, and the middle section of the third suspender and the middle section of the fourth suspender are adjacent.

6. The micromechanical reflector system of claim 5, wherein the micromechanical reflector system is configured to drive oscillation of the reflector body about a second rotation axis of the rotation axes by:
actuating the second piezoelectric actuator of the inner section of the first suspender of the suspenders and actuating the second piezoelectric actuator of the inner section of the fourth suspender of the suspenders such that a third side of the reflector body is displaced upwards relative to the plane of the reflector body; and
actuating the second piezoelectric actuator of the inner section of the second suspender of the suspenders and actuating the second piezoelectric actuator of the inner section of the third suspender of the suspenders such that a fourth side of the reflector body is displaced downwards relative to the plane of the reflector body, wherein the fourth side of the reflector body is opposite to the third side of the reflector body.

7. The micromechanical reflector system of claim 1, wherein the suspenders are arranged equidistantly around the perimeter of the reflector body, and each suspender is a 90-degree rotation relative to adjacent suspenders.

8. The micromechanical reflector system of claim 7, wherein the micromechanical reflector system is configured to drive oscillation of the reflector body about a first rotation axis of the rotation axes by:
actuating the first piezoelectric actuator of the outer section of a first suspender of the suspenders and actuating the first piezoelectric actuator of the inner section of a second suspender of the suspenders such that a first side of the reflector body is displaced upwards relative to the plane of the reflector body, wherein the middle section of the first suspender and the middle section of the second suspender are adjacent; and
actuating the first piezoelectric actuator of the outer section of a third suspender of the suspenders and actuating the second piezoelectric actuator of the inner section of a fourth suspender of the suspenders such that a second side of the reflector body is displaced downwards relative to the plane of the reflector body, wherein the second side of the reflector body is opposite to the first side of the reflector body, and the middle section of the third suspender and the middle section of the fourth suspender are adjacent.

9. The micromechanical reflector system of claim 8, wherein the micromechanical reflector system is configured to drive oscillation of the reflector body about a second rotation axis of the rotation axes by:
actuating the first piezoelectric actuator of the outer section of the fourth suspender of the suspenders and actuating the second piezoelectric actuator of the inner section of the first suspender of the suspenders such that a third side of the reflector body is displaced upwards relative to the plane of the reflector body; and
actuating the first piezoelectric actuator of the outer section of the second suspender of the suspenders and actuating the second piezoelectric actuator of the inner section of the third suspender of the suspenders such that a fourth side of the reflector body is displaced downwards relative to the plane of the reflector body, wherein the fourth side of the reflector body is opposite to the third side of the reflector body.

10. The micromechanical reflector system of claim 1, wherein each suspender further comprises a first spring that connects the inner section to the reflector body and a second spring that connects the middle section to the reflector body.

11. The micromechanical reflector system of claim 1, wherein each pair of adjacent suspenders is connected via a single spring to the reflector body.

12. The micromechanical reflector system of claim 1, wherein the reflector body comprises weight areas disposed at opposite sides of the reflector body and between each pair of suspenders.

13. The micromechanical reflector system of claim 12, wherein the suspenders are connected to the reflector body via the weight areas.

14. The micromechanical reflector system of claim 1, wherein the suspenders are connected to the reflector body via torsion springs.

15. The micromechanical reflector system of claim 1, wherein the middle section of each suspender is stiffer than the inner and outer sections of the suspender.

16. The micromechanical reflector system of claim 1, wherein in each suspender, the first piezoelectric actuator is located close to or at the first end of the outer section, and wherein the second piezoelectric actuator is located close to or at the first end of the inner section.

17. The micromechanical reflector system of claim 16, wherein in each suspender, one or more sense electrodes are located parallel to and alongside the first piezoelectric actuator and the second piezoelectric actuator.

* * * * *